April 30, 1957   P. D. LA RIVIERE ET AL   2,790,908
RADIOGRAPHIC METHOD AND MEANS FOR DETECTING
ACTIVITY-BEARING PARTICULATE MATTERS
Filed Aug. 7, 1953
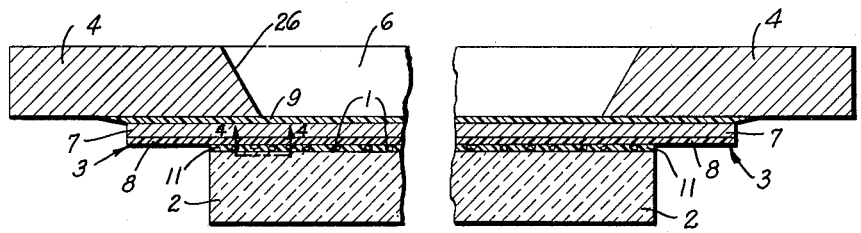
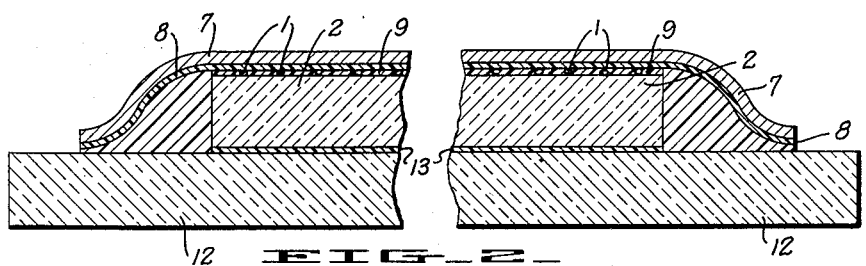
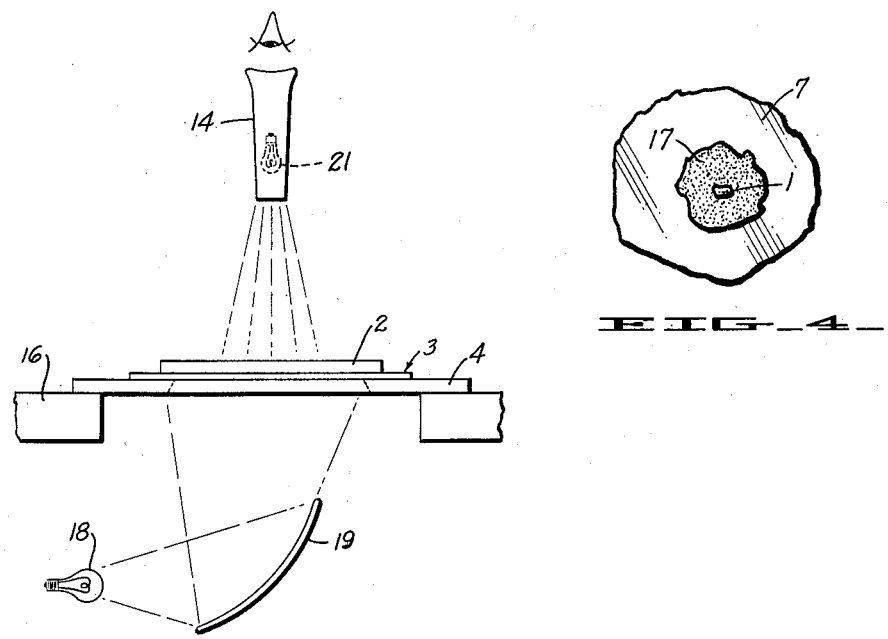
INVENTORS.
Philip D. La Riviere
Stephen K. Ichiki
BY
ATTORNEYS 2,790,908
Patented Apr. 30, 1957

2,790,908

RADIOGRAPHIC METHOD AND MEANS FOR DETECTING ACTIVITY-BEARING PARTICULATE MATTERS

Philip D. La Riviere, Palo Alto, and Stephen K. Ichiki, San Francisco, Calif., assignors to the United States of America as represented by the Secretary of the Navy Application August 7, 1953, Serial No. 373,071

3 Claims. (Cl. 250—65)

(Granted under Title 35, U. S. Code (1952), sec. 266)

This invention may be manufactured and used by or for the Government of the United States of America for governmental purposes without payment of any royalties thereon or therefor.

This invention relates to autoradiography and, more particularly, to a method and means for detecting activity-bearing particulate matter.

Autoradiography has, for some time, been rather commonly used in the identification and differentiation of radiactive and inert particles and, in fact, two rather distinct radiographic processes have been developed, one of which is generally referred to as track autoradiography and the other, contrast autoradiography. In the so-called track method, the individual radioactive particles form a path which may be recorded in photographic emulsion, and although such tracking is believed to be a more sensitive technique for detecting beta activity it, nevertheless, presents certain difficulties when attempting to autoradiograph an aerosol sample mounted on a slide, or the like. One of these difficulties arises because of the wide-spread size range of particles contained in an aerosol sample, this varying from 0.01 to 10 microns, and, when it is recalled that the activities of these particles may be proportional either to their diameters or to their surfaces and volumes, it may be seen that their specific activities may vary from factors of $10^3$ to $10^9$. With such activity ranges, it becomes almost impossible to obtain a distinguishable and countable number of tracks for both the large and small particles.

The so-called contrast autoradiographic method differs quite radically from the tracking in that no individual activity tracks are produced. Instead a static image or autograph is developed by the radiations of each active particle. Since this autograph or image is static, the contrast method does not involve the activity range difficulties of the tracking method, but, nevertheless, its use for detecting the active particles in a deposited aerosol has presented other real problems which heretofore have rendered its use most difficult and laborious. For instance, in one contrast autoradiographic method that has been prepared, the radioactive particles are positioned on or in the surface of a photographic emulsion and, as might be anticipated, this method is at best a compromise solution because the particles then become inextricably confused with the surface fog grains in the emulsion. Also, any use of this process has been seriously handicapped in that it has been necessary to employ permeable samples to permit diffusion of the processing solutions to the emulsions. Further, when the particles are positioned in the emulsion, the autographs that also are developed in the emulsions, unfortunately, obliterate the particles and render it impossible to observe the particles themselves.

In another contrast type of particle radiography, the particles are collected on a filter which then is brought into contact with an X-ray film. After exposure, removal of the film from the filter, and processing, the film displays black spots in those regions contacted by radioactive particles, and an attempt then is made to register the filter and the film. With these two members so registered, small discs then are cut out of the filter paper and placed on a slide where the filter paper fibers are intricately separated and again autographed when separated. This autograph film also is processed and then re-registered on the slide sample to which it is secured by a hinge. The purpose of this complicated procedure is to produce a hinged mount on which the spots on the film are directly over the active particle, so that the particle itself can be viewed when the film is swung away from the slide. As may easily be appreciated, such a procedure is unusually lengthy and difficult, although the more damaging consideration is that accuracy and dependable results depend far too much upon precise and skillful manipulations and technique. This process is described primarily to indicate the lengths to which the prior art has gone to accomplish the objects of the present invention.

As to the present invention, it has as a primary object the provision of an unusually simple manner of accurately and clearly detecting active particulate matter present in a deposited aerosol or the like.

A more specific object is to provide a contrast autoradiographic method of detecting active particles in a rapid manner and in a manner which eliminates the need for skillful and painstaking manipulations by a technician.

A related object is to provide a radiographic method in accordance with the above objects in which the developed sample can be stored and handled without disturbing the initial relationship of the particles and their autographs.

Other objects will become apparent from the following detailed description and the accompanying drawing.

The achievement of the broader aspects of the invention stems from the discovery that autoradiographs of active particulate matter can be developed in a plane that is physically spaced and separated from the particles themselves, and in addition, the finding that the particles can be located and clearly distinguished when they are so physically spaced but nevertheless aligned with their autographs. By separating the particles from the sensitive emulsion necessary for obtaining autoradiographs, the previous difficulties arising due to confusion between emulsion surface fog grains and the particles themselves is largely eliminated, because the optical objective then can be focused on the plane of the particles which plane is spaced from the plane of the emulsion fog grains. Further, the invention takes advantage of the fact that the spacing of the particles from their radiographs enables the particles to be viewed without being obscured or blacked-out by the dense spot of their autographs, such obscurement being ever-present in those methods which place the particles in or on the emulsion in which their autographs appear.

As to the particular apparatus for accomplishing these purposes, it has been found that commercially-available stripping film, such as Eastman Kodak Stripping Film NTB, or J-3 18301, is suitable as a medium for spacing and separating the particles. Such film generally is formed of an emulsion mounted on a thin cellulose ester support or base and provided with a heavy cellulose backing which in the practice of the present invention may be stripped off and discarded. In use, this film may be placed over a thin glass sample slide with the cellulose base or support contacting the sample and physically separating the particulate matter in the sample from the emulsion. Preferably, the sample slide is cemented, by balsam or other adherents, to a larger support slide to facilitate handling, or, as will be explained later, the film itself may be secured to a perforated steel plate. With the assembly tightly and permanently secured together, such exposure and development as is necessary to develop the autoradiographs may be conducted. As to the stripping film, the important finding has been that the object can be exposed to the emulsion through its thin cellulose support or base, thus leaving the face of the emulsion accessible for development and fixation.

The actual detection or viewing of the particles is accomplished by the use of an optical microscope on the stage of which the assembly is placed in an inverted position, vis with the back of its sample slide uppermost so as to position the particles above their autographs. When so positioned, the viewing is easily accomplished with the aid of sub-stage illumination to outline the autographs and overstage illumination to throw light onto the particle that lies above the dense, opaque autograph. The autograph greatly facilitates the locating of the particles, particularly in the event of weak autographs and small particles and the physical spacing of the particle enables the microscope to be focused on the particle so as to throw out of focus the distracting and confusing background fog of the emulsion.

In the drawing: Fig. 1 illustrates a cross-section of an assembled autoradiograph containing an aerosol sample; Fig. 2 is a modified autoradiograph assembly; Fig. 3 is a schematic of the viewing apparatus for autoradiographs; and Fig. 4 is plan view of the aerosol sample taken along line 4—4 of Fig. 1 showing an active particle and its autograph.

Referring to the drawings, the embodiment illustrated in Fig. 1 shows an aerosol sample 1 mounted on a thin, transparent slide 2 and bonded to an emulsion stripping film 3 that in turn is adhered to a stainless steel plate 4 provided in the manner shown with an opening or a viewing window 6. The sample, as has been indicated, normally contains widely varying sizes of both radioactive and inert particles, while slide 2 may be formed of any sufficiently thin material, such as glass, plastic or filter paper on which the particles may be collected. Stripping film 3, however, is a commercially available product, such as is marketed by Eastman as type NTB or J-3 18301, although, as would be expected, any emulsion assembly which would serve the purposes of the stripping film could readily be substituted for these commercial products The important elements of the stripping film are a layer of emulsion 7 which must be photographically sensitive to the radiations of the sample particles, and a thin transparent cellulose ester base 8 that is approximately 10 microns in thickness and is adapted to be permanently bonded to the slide by a thin film of adhesive 11. As will be appreciated, base 8 may be formed of other materials, although, most suitably, the base should be formed of a material capable of unreactively and inertly permitting passage through it of particle activity. In addition, commercially obtainable stripping film usually is provided with a heavy, cellulose supporting sheet which, for purposes of the present invention, is stripped from the film and discarded so as to permit emulsion layer 7 to be directly bonded to steel plate 4 by an adhesive layer 9.

For reasons which will become more apparent, one of the important features of the invention resides in the fact that the particles of sample 1 are physically separated and spaced from emulsion 7 by means of cellulose ester base 8 of the stripping film. Generally, the advantage of such an arrangement is that the autoradiographs of the particles then are produced in a plane that is physically spaced from the plane of the particles themselves, such a spacing permitting the particles to be observed without being obscured by their darkened autoradiographic images.

Another feature of considerable importance is the fact that the assembly is permanently bonded together as a unit and, as already described, this is accomplished by the layers of adhesive 9 and 11 which may be the bonding material, an example of which is described later. Such a unitary structure assures that the autographs always will remain in fixed alignment with the particles producing them because, as is apparent, the emulsion can be bonded to the sample slide before development and fixation. The permanently bonded unit excludes the introduction of contaminating foreign material in the sample and likewise seals the aerosol particles. However, bonding of the stripping film to the sample slide is a rather critical step in the production of an assembly such as will permit accurate observation of the particles. Specifically, the adhesive used must meet stringent requirements in that it must be both transparent and structureless under an optical microscope and it also must be insoluble and inert in photographic solutions. In addition, this adhesive must not be of such a nature as to dissolve cellulose film base 8 of the stripping film and it should have the physical capacity of even shrinkage so as to produce a smooth, tight bond over the sample and between the film base and slide. One adhesive bonding material that has demonstrated its suitability can be made by dissolving 100 mg. chrome alum in 15 ml. water with heat; adding 1 g. gelatin to 35 ml. hot water, and adding 2 ml. glycerine to the gelatin with constant stirring.

A slightly modified version of the stripping film and slide assembly is illustrated in Fig. 2, although this modified assembly is very similar both functionally and structurally to that already described with reference to Fig. 1. In fact, the main difference lies in the manner in which the slide and emulsion are mounted for viewing, rather than in any departure in the particular assembly of the stripping film and the slide. Thus, using the same numerals for identical elements, the assembly of Fig. 2 includes a slide 2, a particle sample 1, an emulsion layer 7 and a cellulose ester base 8. Further, sample slide 2 is adhered to base 8 of the stripping film by a layer of adhesive 9 which should fulfill all of the requirements previously described with reference to the adhesive of the first described assembly. The sole difference, from a structural point of view, is that the Fig. 2 assembly is mounted on a cover glass 12 instead of on stainless steel plate 4 of the Fig. 1 assembly. One of the advantages of the Fig. 1 assembly is that one thickness of convex glass is eliminated making it possible to use it with short focal length oil-immersion objectives.

The manner in which the assemblies of Figs. 1 and 2 are viewed forms another equally important feature of the invention, although, as has been indicated, the structure of the assembly which spaces the particles from their autoradiographs is the one factor which enables these particles to be viewed in the manner to be described. The viewing, of course, is accomplished by means of an optical microscope 14, schematically shown in Fig. 3, and this microscope is provided in the usual manner with a stage 16 on which the objects to be viewed are placed. For purposes of the present invention, the assemblies are placed on stage 16 in what amounts to an inverted position in which the particles of sample 1 are uppermost with respect to their autographs which have been photographically developed in emulsion 7. The exposure and development of these autographs form no particular part of the invention and it may be accomplished in any conventional manner, although, as has been stated, one of the important findings of the invention is that it is possible to form these autographs in an emulsion layer which is physically separated, by means of cellulose ester base 8, from the particles themselves. When the assembly is exposed and developed, the radioactive particles form a darkened opaque autoradiograph 17 (Fig. 4) in emulsion layer 7, while inert particles produce no such effect.

Using the Fig. 1 assembly to described the viewing operations, after steel plate 4 has been rested on stage 16 with its window 6 directly beneath the lense objective, autoradiograph 17 can easily be viewed by the use of sub-stage illumination produced by a light source 18 and a reflector 19. Such sub-stage illumination sharply outlines the opaque radiographs but, at the same time, it places the particles themselves within their shadow. This difficulty, however, may be resolved by the use of over-stage illumination produced by a light source 21, such as is included in some commercially available optical microscopes, and, when such illumination is used, the particles themselves can be observed by first locating their autoradiographs in the objective and then bringing the focus of the microscope into the plane of the particles, which, as stated, is spaced above the plane of the autoradiographs.

By folowing such a technique, it is relatively a simple matter to differentiate between active and inactive particles, since the inactive are readily ascertainable by the absence of any autoradiographs. Further, considerable data can be obtained both by observation and analyses. For example, the size distribution of the active and inert particles can be measured, following which area and volume distributions can be computed. Also, a simple count of the number of active and inactive particles per unit slide area yields the active fraction of the gross collection, while the number of active particles and their activity permits the activity per unit volume of the aerosol to be obtained. While the technique has some limitations, these limitations are, for the most part, common to any technique involving the use of optical microscopes. Qualitative information regarding specific activities or, in other words, activities per unit volume of individual particles, also is possible, although such qualitative information probably will have to be obtained by comparing the autoradiographic images observed with other standardized autoradiographic images serving as calibrations. Nevertheless, accurate data may be quickly determined without the necessity of going through such tedious and complicated procedures as have been considered necessary. Also, since there is no need for actual manipulation of the particles to align them with their particle autoradiographs, the invention provides a method by which data can be obtained by relatively unskilled technicians. Yet another valuable improvement is that permanently bonded assemblies are provided and such assemblies can be handled and stored without any appreciable danger of disturbing the initial relationship betwen the particles and their images. Of course, the fact that the particles can be viewed at all is of primary importance and this, as has been stated, is due to the spaced arrangement between the film emulsion and the sample, such as allows the otherwise obscuring fog grains of the emulsion to be, at least, thrown out of focus.

Obviously many modifications and variations of the present inventions are possible in the light of the above teachings. It is, therefore, to be understood that within the scope of the appended claims the invention may be practiced otherwise than as specifically described.

We claim:

1. Autoradiographic apparatus for detecting active particulate matter comprising a transparent thin slide for mounting a sample of said matter, a radiographically-sensitive material disposed adjacent said mounted sample, and a thin transparent material spacing said radiographic material from said sample, said transparent material being unreactively and inertly permeable to said activity whereby autoradiographs of said active particulate matter can be developed in said spaced sensitive material.

2. Autoradiographic apparatus for detecting active particulate matter comprising a transparent thin slide for mounting a sample of said matter, a radiographically-sensitive material disposed adjacent said mounted sample, a thin transparent material spacing said radiographic material from said sample, said transparent material being unreactively and inertly permeable to said activity whereby autoradiographs of said active particulate matter can be developed in said spaced sensitive material, and thin transparent and substantially structureless means for adhesively securing said slide to said transparent spacing material.

3. A method of autoradiographically detecting active particulate matter, comprising inseparably assemblying a particle sample slide and a radiographic emulsion with a transparent unreactively-permeable sheet material disposed therebetween, forming autoradiographs in said emulsion, disposing said assembly on a microscope stage with said particle sample above said emulsion autoradiographs, locating said particles by said autoradiographs, and focusing said microscope in the plane of said particles.

References Cited in the file of this patent

UNITED STATES PATENTS

| | | |
|---|---|---|
| 1,427,714 | Beck | Aug. 29, 1922 |
| 1,561,751 | Smith | Nov. 17, 1925 |
| 2,146,506 | Maisch | Feb. 7, 1939 |
| 2,279,023 | Kallmann | Apr. 7, 1942 |
| 2,603,755 | De Ment | July 15, 1952 |
| 2,733,353 | Pirson | Jan. 31, 1956 |